(12) United States Patent
Chen et al.

(10) Patent No.: US 12,398,242 B2
(45) Date of Patent: Aug. 26, 2025

(54) SLURRY COMPOSITION AND PREPARATION METHOD THEREFOR

(71) Applicant: Prior Company Limited, Taipei (TW)

(72) Inventors: Ying-Chen Chen, Taipei (TW); Cheng-Hsin Tsai, Taipei (TW); Chun-Yeh Chu, Taipei (TW)

(73) Assignee: Prior Company Limited, Taipei (TW)

( * ) Notice: Subject to any disclaimer, the term of this patent is extended or adjusted under 35 U.S.C. 154(b) by 507 days.

(21) Appl. No.: 17/920,800

(22) PCT Filed: Jan. 13, 2021

(86) PCT No.: PCT/CN2021/071477
§ 371 (c)(1),
(2) Date: Oct. 24, 2022

(87) PCT Pub. No.: WO2022/151042
PCT Pub. Date: Jul. 21, 2022

(65) Prior Publication Data
US 2023/0203251 A1   Jun. 29, 2023

(51) Int. Cl.
| | | |
|---|---|---|
| *C08G 77/18* | (2006.01) | |
| *C08K 3/36* | (2006.01) | |
| *C08K 5/07* | (2006.01) | |

(52) U.S. Cl.
CPC ............. *C08G 77/18* (2013.01); *C08K 3/36* (2013.01); *C08K 5/07* (2013.01)

(58) Field of Classification Search
CPC ............. C08G 77/18; C08K 3/36; C08K 5/07
USPC ........................................................ 524/588
See application file for complete search history.

(56) References Cited

U.S. PATENT DOCUMENTS

2007/0126331 A1   6/2007   Kim et al.

FOREIGN PATENT DOCUMENTS

| | | | | |
|---|---|---|---|---|
| CN | 101668806 | | 3/2010 | |
| CN | 102617966 | | 8/2012 | |
| CN | 106674602 | | 5/2017 | |
| CN | 106674602 A | * | 5/2017 | ............ C08K 3/38 |
| CN | 110520468 | | 11/2019 | |
| CN | 111763323 | | 10/2020 | |
| JP | 2006036916 | | 2/2006 | |
| JP | 2009190909 | | 8/2009 | |
| TW | 200904896 | | 2/2009 | |
| TW | I454526 | | 10/2014 | |
| WO | 2017067123 | | 4/2017 | |
| WO | 2017067124 | | 4/2017 | |

OTHER PUBLICATIONS

"International Search Report (Form PCT/ISA/210) of PCT/CN2021/071477", mailed on Sep. 28, 2021, with English translation thereof, pp. 1-4.

* cited by examiner

*Primary Examiner* — Deve V Hall
(74) *Attorney, Agent, or Firm* — JCIPRNET

(57) ABSTRACT

A slurry composition and a preparation method therefor. The slurry composition comprises a filler, a slurry carrier, and a dispersing agent. The slurry carrier comprises a solvent or resin. The dispersing agent is a small molecule multifunctional cross-linking dispersing agent having at least two functional groups of crosslinkable double bonds, has a higher boiling point, thermal stability, and low polarity, and has good dispersion characteristics for fillers.

15 Claims, 1 Drawing Sheet

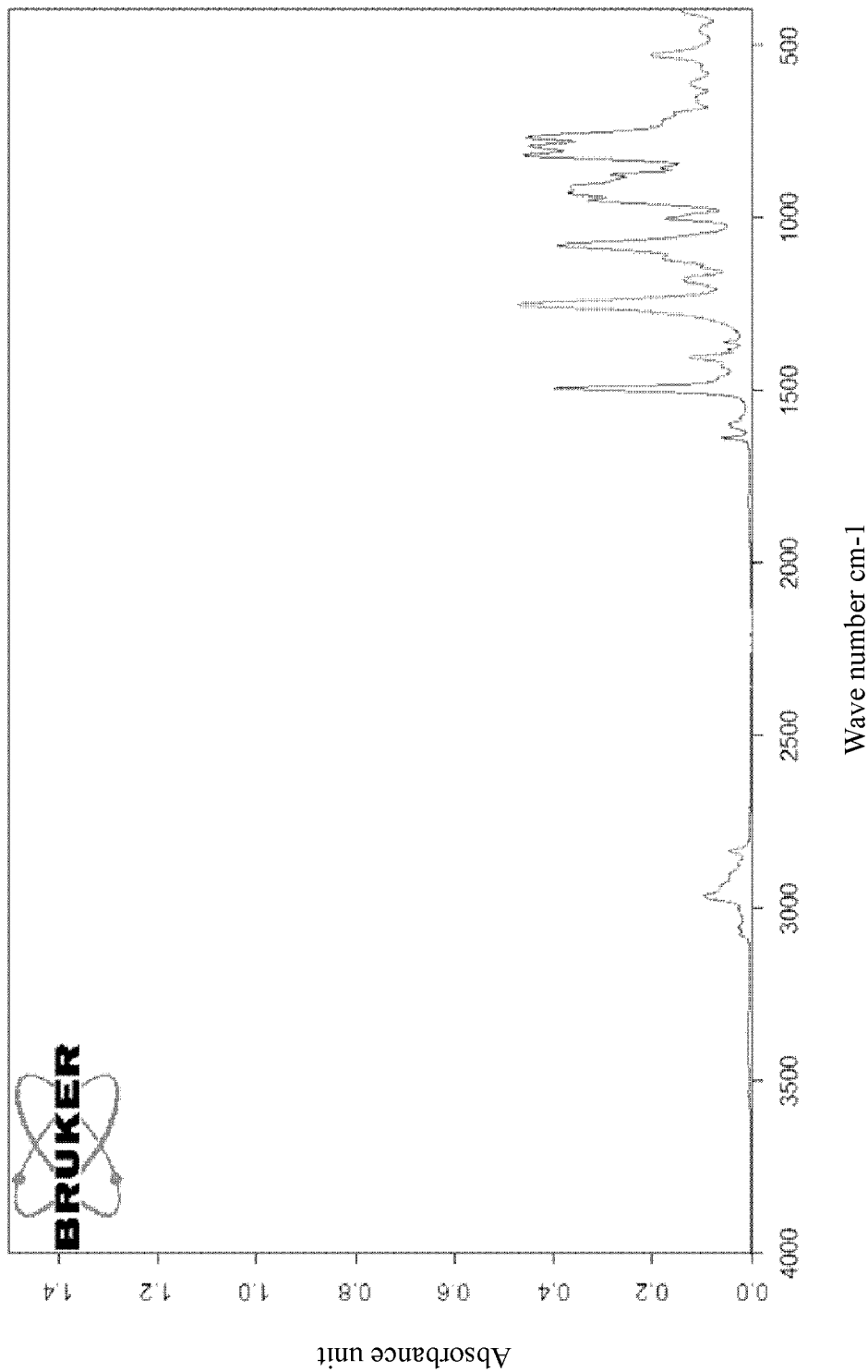

SLURRY COMPOSITION AND PREPARATION METHOD THEREFOR

CROSS-REFERENCE TO RELATED APPLICATION

This application is a 371 application of the International PCT application serial no. PCT/CN2021/071477, filed on Jan. 13, 2021. The entirety of the above-mentioned patent application is hereby incorporated by reference herein and made a part of this specification.

TECHNICAL FIELD

The present invention relates to a composition and a preparation method thereof, and in particular relates to a slurry composition and a preparation method thereof.

RELATED ART

The technology of the PCB industry, whether for flexible boards or rigid boards, is developing toward high-frequency, high-speed, and high-density packaging, and to correspond to the development trend of light, thin, portable, and multifunctional products, the wiring of copper clad laminates is getting denser and thinner between the layers, which imposes stricter requirements on the impedance characteristics and reliability of the transmission lines and the assembly and processing accuracy of the components. Under the requirements of high frequency, high speed, and miniaturization, high-frequency transmission and low-loss materials will completely replace transmission lines, and circuit boards are required to have high heat resistance, low moisture absorption, low dielectric properties, and good flame resistance.

As 5G is used more and more extensively, the demand for high-frequency and high-speed materials has gradually grown, which drives various electronic devices to be lighter, thinner, and smaller. Consequently, the PCB board used to carry electronic components or the carrier board used to carry semiconductor chips also needs to be thinned. Moreover, to cope with the heat generation and heat dissipation problems caused by the high component density, the PCB or carrier board are also required to meet higher dimensional stability requirements.

At present, the most effective way to improve the dimensional stability of the copper clad laminate and the carrier board is to add a filler at a higher ratio in the resin glue, and the effects of improving the dimensional stability and heat dissipation performance can be achieved by selecting the filler type, particle size, and addition ratio. However, a high filler ratio will cause the viscosity of the resin glue to increase significantly, which is not conducive to processing. Besides, as the filler ratio increases, the filler particles tend to aggregate and are not uniformly dispersed easily in the resin glue, which may result in defects in the subsequent processing and poor quality. In order to solve the dispersion problem due to a high filler ratio, it is common to add an additional dispersing agent to the resin glue to help the filler particles disperse properly in the resin glue.

In addition, to make the resin glue with a high filler ratio easy to process and use, another solution is to prepare a filler slurry having a high solid content in advance, and then add this slurry to the resin glue for mixing. Such a filler slurry generally contains filler particles at a high ratio, a medium solvent or resin used as the slurry carrier, and a dispersing agent. Since the slurry requires a high proportion of filler, the dispersing effect of the dispersing agent on the filler and the compatibility with the solvent or resin directly determine the viscosity and uniformity of the slurry during the preparation and stirring process, whether the filler particles in the slurry are agglomerated, and the stability of the slurry itself, which affects the final performance of the slurry added to the resin glue.

Meanwhile, the coating and ink industry is gradually developed toward low VOC and high solid content for the purpose of reducing the harm to the environment during the application and drying processes of the coating. However, various functional coatings or inks usually need to be added with various functional fillers, such as pigments or fillers, according to the purposes. The pigments may be, for example, titanium white, carbon black, aluminum powder, organic pigments or other electroplating toners. The functional fillers may be, for example, silver powder, nickel powder, magnesium oxide, aluminum oxide, glass powder or aluminum hydroxide. As the proportion of the pigments or fillers in the formula is gradually increased, the viscosity of the overall formula is greatly increased, which may easily result in uneven dispersion and agglomeration between the particles and cause similar processing and quality problems as mentioned above.

In order to solve the above problems, one solution commonly adopted in the related art is to add a dispersing agent for the amount added is too little to affect the physical properties too much, and the dispersing agent is easily available and does not lead to a significant increase in cost. However, the conventional dispersing agents are mostly non-reactive dispersing agents, and are prone to cause problems in terms of product reliability. Generally speaking, the common dispersing agent such as modified polysiloxane (modified silicone oil) is characterized by low surface energy, good encapsulation for filler particles, and compatibility with the resin system. However, since the dispersing agent itself does not participate in the curing reaction of the resin, the dispersing agent may be regarded as the presence of a plasticizer in the cured material and have a negative impact on the physical properties of the material, for example, lowering the Tg point of the material, reducing mechanical properties or reducing weather resistance.

Based on the above, it is a goal for those skilled in the art to develop a small molecule multifunctional cross-linking dispersing agent which has a high boiling point, achieves a good dispersing effect, can participate in the cross-linking reaction with the resin system, has thermal stability and low polarity, and can prevent the subsequent precipitation problem.

SUMMARY OF INVENTION

The present invention provides a slurry composition and a preparation method thereof. The slurry composition includes a dispersing agent. The dispersing agent has at least two functional groups of crosslinkable double bonds, has a high boiling point, thermal stability, and low polarity, has good dispersion characteristics for fillers, and can be used in combination with epoxy resin, polyurethane acrylic resin, polyphenylene ether, polytetrafluoroethylene, hydrocarbon resin, etc. to prepare a stable slurry.

The slurry composition of the present invention includes a filler, a slurry carrier, and a dispersing agent. The slurry carrier includes a solvent or resin. A structure of the dispersing agent is represented by formula (1) or formula (2):

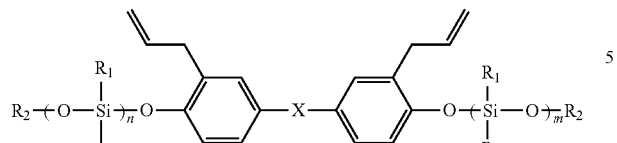

formula (1)

in formula (1), X is linear or branched C1 to C6 alkyl, cycloalkyl or sulfonyl, R1 is linear or branched C1 to C6 alkyl or aryl, R2 is C1 to C6 alkyl, R3 is a functional group with a crosslinkable double bond, and n+m is a positive integer from 1 to 8,

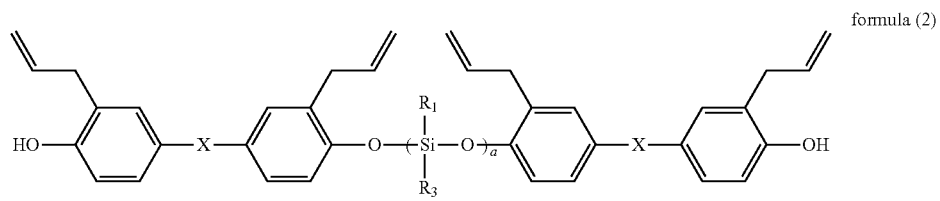

formula (2)

in formula (2), X is linear or branched C1 to C6 alkyl, cycloalkyl or sulfonyl, R1 is linear or branched C1 to C6 alkyl or aryl, R3 is a functional group with a crosslinkable double bond, and a is a positive integer from 1 to 4.

In an embodiment of the present invention, the functional group with the crosslinkable double bond includes allyl, vinyl, acrylate or methacrylate.

In an embodiment of the present invention, n+m is 2 or 3.

In an embodiment of the present invention, the filler includes silica or alumina.

In an embodiment of the present invention, the solvent includes acetone, butanone, cyclohexanone, ethyl acetate, toluene, propylene glycol methyl ether, isopropanol or a petroleum solvent.

In an embodiment of the present invention, the resin includes epoxy resin, urethane acrylate resin, polyphenylene ether, polytetrafluoroethylene or hydrocarbon resin.

In an embodiment of the present invention, a content of the filler is 30 phr to 70 phr, a content of the solvent is 20 phr to 70 phr, and a content of the dispersing agent is 0.5 phr to 5.0 phr.

In an embodiment of the present invention, a content of the filler is 30 phr to 50 phr, a content of the resin is 40 phr to 70 phr, and a content of the dispersing agent is 0.5 phr to 2.5 phr.

A preparation method of a slurry composition according to the present invention is provided for preparing the above-mentioned slurry composition, and includes the following steps. A filler, a slurry carrier, and a dispersing agent are mixed, and the slurry carrier includes a solvent or resin. Then, stirring is performed to break agglomeration of filler particles, so that the filler particles are uniformly dispersed in the slurry carrier to form the slurry composition. A structure of the dispersing agent is represented by formula (1) or formula (2):

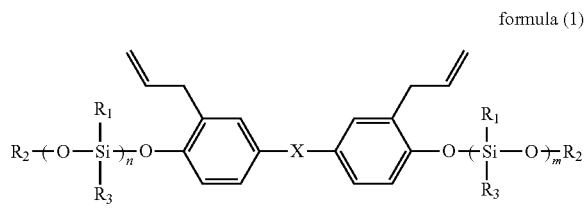

formula (1)

in formula (1), X is linear or branched C1 to C6 alkyl, cycloalkyl or sulfonyl, R1 is linear or branched C1 to C6 alkyl or aryl, R2 is C1 to C6 alkyl, R3 is a functional group with a crosslinkable double bond, and n+m is a positive integer from 1 to 8,

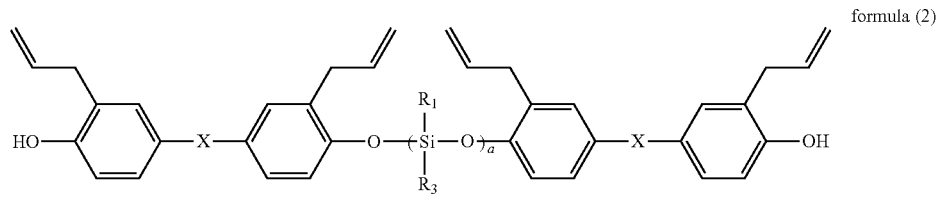

formula (2)

in formula (2), X is linear or branched C1 to C6 alkyl, cycloalkyl or sulfonyl, R1 is linear or branched C1 to C6 alkyl or aryl, R3 is a functional group with a crosslinkable double bond, and a is a positive integer from 1 to 4.

In an embodiment of the present invention, the functional group with the crosslinkable double bond includes allyl, vinyl, acrylate or methacrylate.

In an embodiment of the present invention, n+m is 2 or 3.

In an embodiment of the present invention, the filler includes silica or alumina.

In an embodiment of the present invention, the solvent includes acetone, butanone, cyclohexanone, ethyl acetate, toluene, propylene glycol methyl ether, isopropanol or a petroleum solvent.

In an embodiment of the present invention, the resin includes epoxy resin, urethane acrylate resin, polyphenylene ether, polytetrafluoroethylene or hydrocarbon resin.

In an embodiment of the present invention, a method of stirring includes ball milling, double-shaft stirring or three-drum grinding.

Based on the above, the present invention provides a slurry composition and a preparation method thereof. The slurry composition includes a dispersing agent. The dispersing agent has at least two functional groups of crosslinkable double bonds, has a high boiling point, thermal stability, and low polarity, has good dispersion characteristics for fillers, and can be used in combination with resin to prepare a stable slurry. In more detail, the dispersing agent of the present invention is modified by silane to reduce its own polarity, and has at least two double bond functional groups that can participate in the cross-linking reaction, and therefore is especially suitable for a high-frequency and high-speed copper clad laminate resin system. In addition, the dispersing agent of the present invention is also suitable for use in a coating or ink system, especially a photocurable coating or ink system, and the dispersing agent and photocurable resin are cross-linked through the action of a photoinitiator to prevent subsequent precipitation and reliability problems that may occur.

BRIEF DESCRIPTION OF DRAWINGS

The accompanying drawings are included to provide a further understanding of the present invention, and are incorporated in and constitute a part of this specification. The drawings illustrate embodiments of the present invention and, together with the description, serve to explain the principles of the present invention.

FIG. 1 is an IR spectrum of the dispersing agent according to the present invention.

DESCRIPTION OF EMBODIMENTS

Hereinafter, embodiments of the present invention will be described in detail. However, these embodiments are exemplary, and the present invention is not limited thereto.

As used herein, a range represented by "one value to another value" is a general representation that avoids listing all the values in the range in the specification. Accordingly, the recitation of a particular numerical range includes any value within that numerical range as well as a smaller numerical range bounded by any values within that numerical range, as if the any value and the smaller numerical range are written in the specification.

The present invention provides a slurry composition which includes a filler, a slurry carrier, and a dispersing agent. In more detail, the filler may include silica or alumina. The slurry carrier may include a solvent or resin. The solvent may include acetone, butanone, cyclohexanone, ethyl acetate, toluene, propylene glycol methyl ether, isopropanol or a petroleum solvent. The resin may include epoxy resin, urethane acrylate resin, polyphenylene ether, polytetrafluoroethylene or hydrocarbon resin. However, the present invention is not limited thereto. In the slurry composition of the present invention, the content of the filler is, for example, 30 phr to 70 phr, the content of the solvent is, for example, 20 phr to 70 phr, and the content of the dispersing agent is, for example, 0.5 phr to 5.0 phr or the content of the filler is, for example, 30 phr to 50 phr, the content of the resin is, for example, 40 phr to 70 phr, and the content of the dispersing agent is, for example, 0.5 phr to 2.5 phr.

In this embodiment, the structure of the dispersing agent can be represented by formula (1) or formula (2):

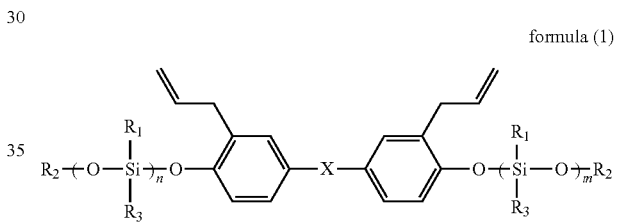

formula (1)

In formula (1), X is linear or branched C1 to C6 alkyl, cycloalkyl or sulfonyl, R1 is linear or branched C1 to C6 alkyl or aryl, R2 is C1 to C6 alkyl, R3 is a functional group with a crosslinkable double bond, n+m is a positive integer from 1 to 8, and n+m is preferably 2 or 3,

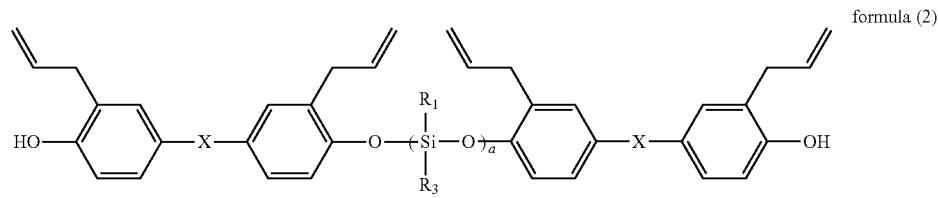

formula (2)

In formula (2), X is linear or branched C1 to C6 alkyl, cycloalkyl or sulfonyl, R1 is linear or branched C1 to C6 alkyl or aryl, R3 is a functional group with a crosslinkable double bond, and a is a positive integer from 1 to 4.

FIG. 1 is an IR spectrum of the dispersing agent according to the present invention, wherein 1600 cm-1 is the characteristic signal of the double bond.

In more detail, in formula (1) and formula (2), R3 is a functional group with a crosslinkable double bond. The functional group with a crosslinkable double bond may include allyl, vinyl, acrylate or methacrylate, but the present invention is not limited thereto. In addition, it should be noted that, in formula (1) and formula (2), R3 may or may not contain an oxygen atom. If R3 contains an oxygen atom, for example, an oxygen atom may be attached first, and then the functional group with a crosslinkable double bond may be attached.

The present invention also provides a preparation method of a dispersing agent, which is used to prepare the above-mentioned dispersing agent represented by formula (1) and formula (2), and a synthesis reaction formula thereof is represented by reaction formula (1):

compound and the silane having a functional group with a crosslinkable double bond may be placed at the bottom of a reaction tank for reaction, or the diallyl bisphenol compound may be placed at the bottom of the reaction tank and the silane having a functional group with a crosslinkable double bond may be added dropwise for reaction, and the dropwise addition time is, for example, 1 hour to 10 hours. When calculated based on the molar ratio of the hydroxyl of the diallyl bisphenol compound to the alkoxy of the dialkoxysilane having a functional group with a crosslinkable reaction formula (1)

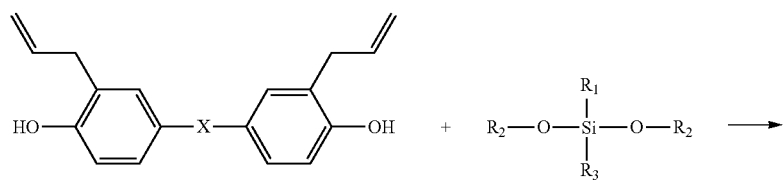

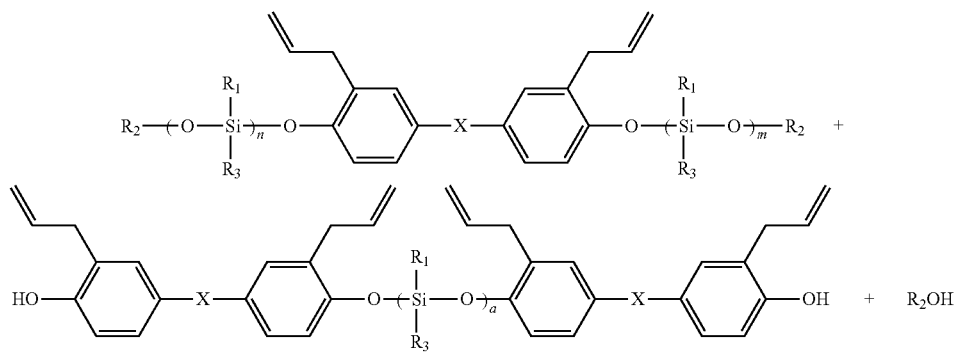

In reaction formula (1), X is linear or branched C1 to C6 alkyl, cycloalkyl or sulfonyl, R1 is linear or branched C1 to C6 alkyl or aryl, R2 is C1 to C6 alkyl, R3 is a functional group with a crosslinkable double bond, n+m is a positive integer from 1 to 8, n+m is preferably 2 or 3, and a is a positive integer from 1 to 4.

In more detail, in reaction formula (1), R3 is a functional group with a crosslinkable double bond. The functional group with a crosslinkable double bond may include allyl, vinyl, acrylate or methacrylate, but the present invention is not limited thereto. In addition, it should be noted that, in reaction formula (1), R3 may or may not contain an oxygen atom. If R3 contains an oxygen atom, for example, an oxygen atom may be attached first, and then the functional group with a crosslinkable double bond may be attached.

As shown in the above reaction formula (1), the present invention mainly utilizes a diallyl bisphenol compound with hydroxyl at both ends and a silane with at least one alkoxy at the end group and at least one functional group with a crosslinkable double bond to perform a dealcoholization reaction at a high temperature under the action of a catalyst so as to obtain the dispersing agent having a functional group with a crosslinkable double bond at the end group (that is, the dispersing agent represented by formula (1) and formula (2)).

In this embodiment, the reaction temperature of reaction formula (1) is, for example, 100° C. to 180° C., preferably 130° C. to 160° C., and the reaction time is, for example, 2 hours to 15 hours. In more detail, the diallyl bisphenol double bond, the ratio of the diallyl bisphenol compound to the dialkoxysilane having a functional group with a crosslinkable double bond is, for example, 1:0.5 to 1:4.0.

In this embodiment, the amount of the catalyst in reaction formula (1) is, for example, 500 ppm to 5000 ppm relative to the weight of the diallyl bisphenol compound. The type of the catalyst may include, but not limited to, an acid catalyst, a base catalyst, a metal compound catalyst, an ester catalyst or a combination thereof. Preferably, the catalyst is, for example, ethyl triphenyl phosphine chloride (ETPPCl), ethyl triphenyl phosphine bromide (ETPPBr), ethyl triphenyl phosphine iodide (ETPPI), ethyl triphenyl phosphine acetate (ETPPAAc), tetrabutyl ammonium bromide (TBAB), triphenyl phosphine (TPP) or tetra-n-butyl ammonium acetate (TBAAc), but the present invention is not limited thereto.

In reaction formula (1), the alkoxysilane having a functional group with a crosslinkable double bond used in the present invention is represented by formula (A):

formula (A)

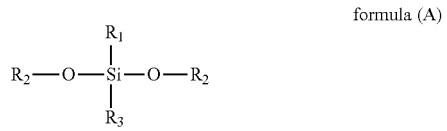

As described above, in formula (A), R1 is linear or branched C1 to C6 alkyl or aryl, R2 is C1 to C6 alkyl, and R3 is a functional group with a crosslinkable double bond. The functional group with a crosslinkable double bond may include allyl, vinyl, acrylate or methacrylate, but the present invention is not limited thereto. In this embodiment, specific examples of formula (A) may include methylvinyldimethoxysilane, methylvinyldiethoxysilane, allylmethyldimethoxysilane, 1-allyl-2,2-dimethoxy-1,2-azasilacyclopentane or a combination thereof, but the present invention is not limited thereto. The chemical structural formulas of the specific examples are as follows:

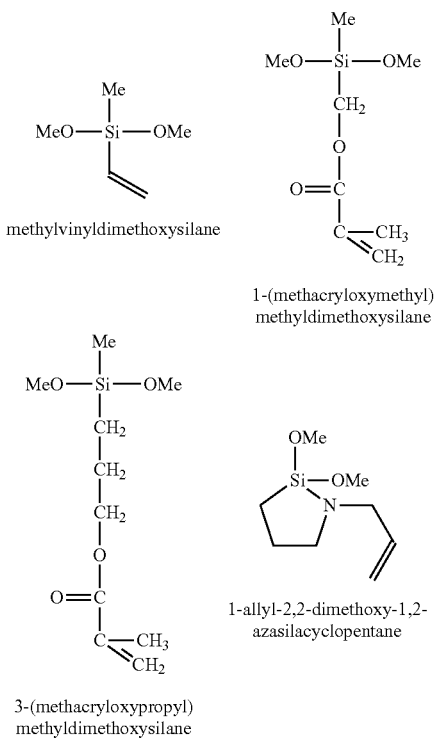

methylvinyldimethoxysilane 1-(methacryloxymethyl) methyldimethoxysilane 3-(methacryloxypropyl) methyldimethoxysilane 1-allyl-2,2-dimethoxy-1,2-azasilacyclopentane Furthermore, the present invention also provides a preparation method of a slurry composition for preparing the above-mentioned slurry composition, which includes the following steps. A filler, a slurry carrier, and a dispersing agent are mixed. The slurry carrier includes a solvent or a resin, and the structure of the dispersing agent is represented by formula (1) or formula (2). Thereafter, stirring is performed to break the agglomeration of filler particles, so that the filler particles are uniformly dispersed in the slurry carrier to form the slurry composition. In more detail, a method of performing the stirring may include ball milling, double-shaft stirring or three-drum grinding, but the present invention is not limited thereto. In the present invention, the agglomeration between the filler particles is broken through the dispersing effect of the dispersing agent on the filler and stirring, thereby forming a stable slurry composition. The slurry composition can then be used as a raw material and mixed with resin glue to be processed and cured, and the pre-dispersing effect of the slurry can easily disperse the filler particles in the resin glue to facilitate processing and reduce defects due to uneven dispersion of the filler after curing. The details of the filler, solvent, resin, and structures of formula (1) and formula (2) have been described above, and therefore will not be repeated here.

In this embodiment, there are two different methods for mixing and adding the filler, the slurry carrier, and the dispersing agent. The first method is to pre-dissolve the dispersing agent in the resin or solvent, and then add the filler. The second method is to pre-mix the solvent or resin with the filler, and then add the dispersing agent. After the filler, the slurry carrier, and the dispersing agent are preliminarily mixed, the mixture is sufficiently stirred to obtain the slurry of the present invention. In more detail, the stirring method may include ball milling, double-shaft stirring or three-drum grinding, but the present invention is not limited thereto.

Hereinafter, the slurry composition and the preparation method thereof according to the present invention will be described in detail based on experimental examples. However, the following experimental examples are not intended to limit the present invention.

EXPERIMENTAL EXAMPLE

In order to show that the slurry composition and the preparation method according to the present invention effectively exert the effects of dispersion and anti-precipitation, the following experimental examples were carried out.

Example 1

The multifunctional dispersing agent of the present invention and cyclohexanone were uniformly mixed at a weight ratio of 5 phr:25 phr, and then 70 phr of a spherical silica filler without surface treatment was added. With simple stirring, the filler was initially mixed with the cyclohexanone solution containing the dispersing agent of the present invention. After the mixture was sealed, it was mixed with a double-shaft mixer (planetary mixer) under a high shear force. The stirring conditions were 2000 rpm for 10 min, followed by 2200 rpm for 2 min. After the stirring was completed, it was placed still to be cooled. The appearance of the sample was visually observed, and after being placed still for one day, the sample was inverted to observe the precipitation state at the bottom of the sample.

Comparative Example 1

The preparation and measurement were performed according to the procedure of Example 1, but the weight ratio of the dispersing agent:cyclohexanone was changed to 0:30 phr.

The formulation contents and observation results of Example 1 and Comparative Example 1 are shown in Table 1 below. As shown in Table 1, regarding the slurry prepared by adding the dispersing agent of the present invention in Example 1, the weight ratio of the filler could be as high as 70 wt %, and there was no obvious precipitation at the bottom of the slurry after it was placed still for one day; on the other hand, after Comparative example 1 which was not added with the dispersing agent of the present invention was placed still for one day, most of the filler settled at the bottom. It can be seen that Example 1 shows that the dispersing agent of the present invention effectively exerts the effects of dispersion and anti-precipitation in this slurry

TABLE 1

|  | Filler Spherical SiO₂ without surface treatment | Solvent Cyclohexanone | Additive Dispersing agent of the present invention | Slurry appearance Observe visually Shake manually | Slurry stability Observe filler precipitation after placing still for one day |
|---|---|---|---|---|---|
| Example 1 | 70 | 25 | 5 | Free-flowing dispersing solution | No or little precipitation |
| Comparative example 1 | 70 | 30 | 0 | Free-flowing dispersing solution | Most precipitation |

Example 2

The dispersing agent of the present invention and cyclohexanone were uniformly mixed at a weight ratio of 1.4 phr:28.6 phr, and then 70 phr of a surface-treated crushed silica filler (manufacturer: Sibelco, model: FS04ARV) was added. With simple stirring, the filler was initially mixed with the cyclohexanone solution containing the dispersing agent of the present invention. After the mixture was sealed, it was mixed with a double-shaft mixer (planetary mixer) under a high shear force. The stirring conditions were 2000 rpm for 10 min, followed by 2200 rpm for 2 min. After the stirring was completed, it was placed still to be cooled. The appearance of the sample was visually observed, and after being placed still for one day, the sample was inverted to observe the precipitation state at the bottom of the sample.

Example 2-1

The preparation and measurement were performed according to the procedure of Example 2, but the order of mixing and adding the filler, the slurry carrier, and the dispersing agent was changed. Cyclohexanone and the surface-treated crushed silica filler were premixed first, and then the dispersing agent was added.

Comparative Example 2

The preparation and measurement were performed according to the procedure of Example 2, but the weight ratio of the dispersing agent:cyclohexanone was changed to 0:30 phr.

The formulation contents and observation results of Example 2, Example 2-1, and Comparative example 2 are shown in Table 2 below. As shown in Table 2, regarding the slurry prepared by adding the dispersing agent of the present invention in Example 2, the weight ratio of the filler could be as high as 70 wt %, and there was no obvious precipitation at the bottom of the slurry after it was placed still for one day; on the other hand, Comparative example 2 which was not added with the dispersing agent of the present invention showed a non-flowing paste after double-shaft stirring, and there were still undispersed filler agglomerates at the bottom of the sample. Example 2 shows that the dispersing agent of the present invention effectively exerts the effects of dispersion and anti-precipitation in this slurry system. In addition, the flow situation of Example 2-1 after cooling to room temperature was slower than that of Example 2, but the flow situation became the same as Example 2 after being placed for one day. Therefore, it can be seen that if the order of mixing and adding the filler, the slurry carrier, and the dispersing agent is changed, the effects of dispersion and anti-precipitation still exist, but it takes a longer time to take effect.

TABLE 2

|  | Filler FS04ARV | Solvent Cyclohexanone | Additive Dispersing agent of the present invention | Slurry appearance Observe visually; Shake manually | Slurry stability Observe filler precipitation after placing still for one day |
|---|---|---|---|---|---|
| Example 2 | 70 | 28.6 | 1.4 | Milky white dispersing solution, easy to flow | No precipitation |
| Example 2-1 | 70 | 28.6 | 1.4 |  | After sample mixing, the flow situation after cooling to room temperature was slower than that of Example 2, but the flow situation became the same as Example 2 after being placed for one day |
| Comparative example 2 | 70 | 30 | 0 |  | Viscous paste, no flow, with a large amount of undispersed filler agglomeration at the bottom of the sample |

Example 3

The dispersing agent of the present invention and bisphenol A epoxy resin (Nanya Plastics, model: NPEL128E) were uniformly mixed at a ratio of 1 phr:49 phr, and then 50 phr of a ALM-43 alumina filler (Sumitomo Chemical) was added. With simple stirring, the filler was initially mixed with the epoxy resin containing the dispersing agent of the present invention. After the mixture was sealed, it was mixed with a double-shaft mixer (planetary mixer) under a high shear force. The stirring conditions were 2000 rpm for 10 min, followed by 2200 rpm for 2 min. After the stirring was completed, it was placed still to be cooled. The appearance of the sample was visually observed, and the viscosity of the sample was measured at a constant temperature of 25° C. The sample jar was tilted to observe the flow of the sample.

Example 3-1

The preparation and measurement were performed according to the procedure of Example 3, but the order of mixing and adding the filler, the slurry carrier, and the dispersing agent was changed. Bisphenol A epoxy resin and the ALM-43 alumina filler were premixed first, and then the dispersing agent was added.

Comparative Example 3

The preparation and measurement were performed according to the procedure of Example 3, but the weight ratio of the dispersing agent:epoxy resin was changed to 0:50 phr.

The formulation contents and observation results of Example 3, Example 3-1, and Comparative example 3 are shown in Table 3 below. As shown in Table 3, the dispersing agent of the present invention can be well compatible with epoxy resin; in the case of the same filler ratio, the dispersing agent of the present invention can effectively disperse the untreated alumina filler, thereby reducing the viscosity of the resin system and facilitating subsequent processing. Example 3 shows that the dispersing agent of the present invention effectively exerts the effects of dispersing, reducing viscosity, and improving flow characteristics in this slurry system. In addition, after Example 3-1 was heated to 40° C., the viscosity was almost the same as that of Example 3. Therefore, it can be seen that if the order of mixing and adding the filler, the slurry carrier, and the dispersing agent is changed, the effects of dispersion and anti-precipitation still exist, but the temperature needs to be raised to take effect.

Example 4

The dispersing agent of the present invention and bisphenol A epoxy resin (Nanya Plastics, model: NPEL128E) were uniformly mixed at a ratio of 1 phr:49 phr, and then 50 phr of a silica filler (Sibelco, model: G2C) was added. With simple stirring, the filler was initially mixed with the epoxy resin containing the dispersing agent of the present invention. After the mixture was sealed, it was mixed with a double-shaft mixer (planetary mixer) under a high shear force. The stirring conditions were 2000 rpm for 10 min, followed by 2200 rpm for 2 min. After the stirring was completed, it was placed still to be cooled. The appearance of the sample was visually observed, and the viscosity of the sample was measured at a constant temperature of 25° C. The sample jar was tilted to observe the flow of the sample.

Example 4-1

The preparation and measurement were performed according to the procedure of Example 4, but the order of mixing and adding the filler, the slurry carrier, and the dispersing agent was changed. Bisphenol A epoxy resin and the silica filler were premixed first, and then the dispersing agent was added.

Comparative Example 4

The preparation and measurement were performed according to the procedure of Example 4, but the weight ratio of the dispersing agent:epoxy resin was changed to 0:50 phr.

The formulation contents and observation results of Example 4, Example 4-1, and Comparative example 4 are shown in Table 4 below. As shown in Table 4, the dispersing agent of the present invention can be well compatible with epoxy resin; in the case of the same filler ratio, the dispersing agent of the present invention can effectively disperse the untreated silica filler, thereby greatly reducing the viscosity and improving the flow characteristics of the resin system and facilitating subsequent processing. Example 4 shows that the dispersing agent of the present invention effectively exerts the effects of dispersing, reducing viscosity, and improving flow characteristics in this slurry system. In addition, after the temperature of Example 4-1 was raised, the viscosity was almost the same as that of Example 4. Therefore, it can be seen that if the order of mixing and adding the filler, the slurry carrier, and the dispersing agent is changed, the effects of dispersion and anti-precipitation still exist, but the temperature needs to be raised to take effect.

TABLE 3

| | Filler ALM43 | Solvent 128E | Additive Dispersing agent of the present invention | Slurry appearance Observe visually; Shake manually | Flow Characteristics Sample jar tilted for 3 s | 25° C. viscosity cps | 40° C. viscosity cps | 50° C. viscosity cps | 60° C. viscosity cps |
|---|---|---|---|---|---|---|---|---|---|
| Example 3 | 50 | 49 | 1 | Viscous mixture, flowable | Smooth flow, faster | 33,000 | 7,250 | 2,000 | 800 |
| Example 3-1 | 50 | 49 | 1 | | | 50,000 | 7,000 | 2,100 | 900 |
| Comparative example 3 | 50 | 50 | 0 | Viscous mixture, flowable | Smooth flow, slightly slower | 48,000 | 11,000 | 3,300 | 1,700 |

TABLE 4

| | Filler G2C | Solvent 128E | Additive Dispersing agent of the present invention | Slurry appearance Observe visually; Shake manually | Flow Characteristics Sample jar tilted for 5 s | 25° C. viscosity cps | 40° C. viscosity cps | 50° C. viscosity cps | 60° C. viscosity cps |
|---|---|---|---|---|---|---|---|---|---|
| Example 4 | 50 | 49 | 1 | Viscous mixture, flowable | Slow flow, faster | 92,000 | 13,000 | 5,500 | 1,900 |
| Example 4-1 | 50 | 49 | 1 | | | 134,000 | 12,800 | 5,400 | 2,000 |
| Comparative example 4 | 50 | 50 | 0 | Viscous mixture, flowable | Slow flow, faster | 162,000 | 28,000 | 13,250 | 7,000 |

Example 5

The dispersing agent of the present invention and urethane acrylate resin (Double Bond Chemical Industry, model: Doublemer 553) were uniformly mixed at a ratio of 1 phr:49 phr, and then 50 phr of a silica filler (Sibelco, model: G2C) was added. With simple stirring, the filler was initially mixed with the urethane acrylate resin containing the dispersing agent of the present invention. After the mixture was sealed, it was mixed with a double-shaft mixer (planetary mixer) under a high shear force. The stirring conditions were 2000 rpm for 10 min, followed by 2200 rpm for 2 min. After the stirring was completed, it was placed still to be cooled. The appearance of the sample was visually observed, and the viscosity of the sample was measured at a constant temperature of 25° C. The sample jar was tilted to observe the flow of the sample.

Comparative Example 5

The preparation and measurement were performed according to the procedure of Example 5, but the weight ratio of the dispersing agent:urethane acrylate resin was changed to 0:50 phr.

The formulation contents and observation results of Example 5 and Comparative example 5 are shown in Table 5 below. As shown in Table 5, the dispersing agent of the present invention can be well compatible with the urethane acrylate resin, and in the case of the same filler ratio, the dispersing agent of the present invention can effectively disperse the untreated silica filler, thereby greatly reducing the viscosity of the resin system and improving flow characteristics for subsequent processing. Since the dispersing agent of the present invention has at least two reactive vinyl functional groups, the dispersing agent can participate in the cross-linking reaction of the urethane acrylate resin so it is especially suitable for use in UV coating systems.

In summary, the present invention provides a slurry composition and a preparation method thereof. The slurry composition includes a dispersing agent. The dispersing agent has at least two functional groups of crosslinkable double bonds, has a high boiling point, thermal stability, and low polarity, has good dispersion characteristics for fillers, and can be used in combination with resin to prepare a stable slurry. In more detail, the present invention breaks the agglomeration between the filler particles through the dispersing effect of the dispersing agent on the filler, and the slurry composition can be further processed and cured after being mixed with the resin glue as a raw material.

The dispersing agent of the present invention has multiple double bonds that can participate in the cross-linking reaction and can be co-cross-linked with other resin containing double bonds, and has good dispersion characteristics for inorganic fillers such as silica and alumina, which can effectively increase the addition ratio of the filler in the resin glue to achieve the effect of improving dimensional stability. In addition, the molecular structure of the dispersing agent of the present invention is symmetrical and low in polarity and has good electrical properties, which is especially suitable for the requirements of high-frequency and high-speed materials. The molecular structure has a core of bisphenol A and a stable Si—O chemical bond, which has certain flame retardant properties. A single molecule with four crosslinkable double bonds and two silicon atoms has excellent affinity and dispersibility for fillers. Thus, the dispersing agent of the present invention can participate in the curing and cross-linking reaction of a resin system, which makes the addition amount more flexible and solve the problems of the existing non-reactive dispersing agent. Moreover, the dispersing agent of the present invention has good compatibility with most organic solvents, and can be applied to both solvent and solvent-free systems.

TABLE 5

| No. | Filler G2C | Resin 553 | Additive Dispersing agent of the present invention | Slurry appearance Observe visually; Shake manually | 40° C. viscosity cps | 50° C. viscosity cps | 60° C. viscosity cps |
|---|---|---|---|---|---|---|---|
| Example 5 | 50 | 49 | 1 | Uniform viscous paste | 1,090,000 | 600,000 | 165,000 |
| Comparative example 5 | 50 | 50 | 0 | Uniform viscous paste | 1,400,000 | 980,000 | 860,000 |

What is claimed is:

1. A slurry composition, comprising:
   a filler;
   a slurry carrier comprising a solvent or resin; and
   a dispersing agent,
   wherein a structure of the dispersing agent is represented by formula (1) or formula (2):

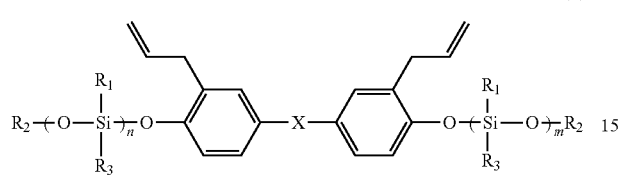

formula (1)

in formula (1), X is linear or branched C1 to C6 alkyl, cycloalkyl or sulfonyl, R1 is linear or branched C1 to C6 alkyl or aryl, R2 is C1 to C6 alkyl, R3 is a functional group with a crosslinkable double bond, and n+m is a positive integer from 1 to 8,

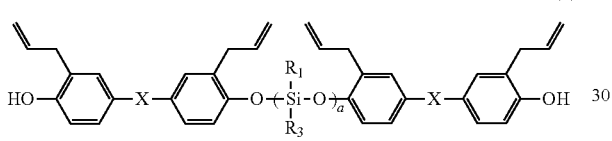

formula (2)

in formula (2), X is linear or branched C1 to C6 alkyl, cycloalkyl or sulfonyl, R1 is linear or branched C1 to C6 alkyl or aryl, R3 is a functional group with a crosslinkable double bond, and a is a positive integer from 1 to 4.

2. The slurry composition according to claim 1, wherein the functional group with the crosslinkable double bond comprises allyl, vinyl, acrylate or methacrylate.

3. The slurry composition according to claim 1, wherein n+m is 2 or 3.

4. The slurry composition according to claim 1, wherein the filler comprises silica or alumina.

5. The slurry composition according to claim 1, wherein the solvent comprises acetone, butanone, cyclohexanone, ethyl acetate, toluene, propylene glycol methyl ether, isopropanol or a petroleum solvent.

6. The slurry composition according to claim 1, wherein the resin comprises epoxy resin, urethane acrylate resin, polyphenylene ether, polytetrafluoroethylene or hydrocarbon resin.

7. The slurry composition according to claim 1, wherein a content of the filler is 30 phr to 70 phr, a content of the solvent is 20 phr to 70 phr, and a content of the dispersing agent is 0.5 phr to 5.0 phr.

8. The slurry composition according to claim 1, wherein a content of the filler is 30 phr to 50 phr, a content of the resin is 40 phr to 70 phr, and a content of the dispersing agent is 0.5 phr to 2.5 phr.

9. A preparation method of a slurry composition, for preparing the slurry composition according to claim 1, the preparation method of the slurry composition comprising:
   mixing a filler, a slurry carrier, and a dispersing agent, wherein the slurry carrier comprises a solvent or resin; and
   stirring to break agglomeration of filler particles in the filler, so that the filler particles are uniformly dispersed in the slurry carrier to form the slurry composition,
   wherein a structure of the dispersing agent is represented by formula (1) or formula (2):

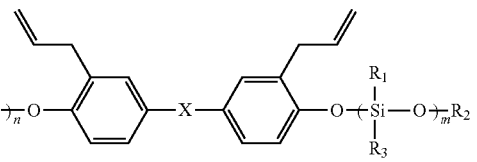

formula (1)

in formula (1), X is linear or branched C1 to C6 alkyl, cycloalkyl or sulfonyl, R1 is linear or branched C1 to C6 alkyl or aryl, R2 is C1 to C6 alkyl, R3 is a functional group with a crosslinkable double bond, and n+m is a positive integer from 1 to 8,

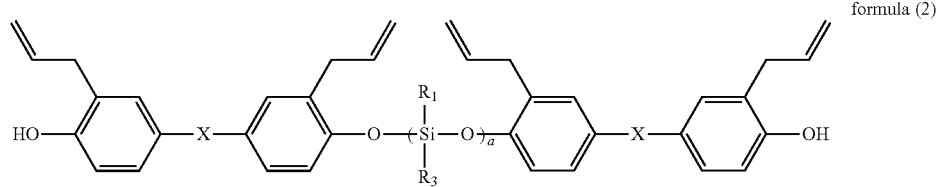

formula (2)

in formula (2), X is linear or branched C1 to C6 alkyl, cycloalkyl or sulfonyl, R1 is linear or branched C1 to C6 alkyl or aryl, R3 is a functional group with a crosslinkable double bond, and a is a positive integer from 1 to 4.

10. The preparation method of the slurry composition according to claim 9, wherein the functional group with the crosslinkable double bond comprises allyl, vinyl, acrylate or methacrylate.

11. The preparation method of the slurry composition according to claim 9, wherein n+m is 2 or 3.

12. The preparation method of the slurry composition according to claim 9, wherein the filler comprises silica or alumina.

13. The preparation method of the slurry composition according to claim 9, wherein the solvent comprises acetone, butanone, cyclohexanone, ethyl acetate, toluene, propylene glycol methyl ether, isopropanol or a petroleum solvent.

14. The preparation method of the slurry composition according to claim 9, wherein the resin comprises epoxy resin, urethane acrylate resin, polyphenylene ether, polytetrafluoroethylene or hydrocarbon resin.

15. The preparation method of the slurry composition according to claim 9, wherein a method of stirring comprises ball milling, double-shaft stirring or three-drum grinding.

\* \* \* \* \*